(12) United States Patent
Srinivasan et al.

(10) Patent No.: US 10,388,077 B2
(45) Date of Patent: Aug. 20, 2019

(54) THREE-DIMENSIONAL ENVIRONMENT AUTHORING AND GENERATION

(71) Applicant: Microsoft Technology Licensing, LLC, Redmond, WA (US)

(72) Inventors: Vidya Srinivasan, Issaquah, WA (US); Carlos G. Perez, Seattle, WA (US); Colton Brett Marshall, Redmond, WA (US); Aniket Handa, Seattle, WA (US); Harold Anthony Martinez Molina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/636,125

(22) Filed: Jun. 28, 2017

(65) Prior Publication Data
US 2018/0308289 A1    Oct. 25, 2018

Related U.S. Application Data

(60) Provisional application No. 62/489,904, filed on Apr. 25, 2017.

(51) Int. Cl.
*G06T 15/00* (2011.01)
*G06T 19/20* (2011.01)
(Continued)

(52) U.S. Cl.
CPC .............. *G06T 19/20* (2013.01); *A63F 13/63* (2014.09); *G06F 3/011* (2013.01); *G06F 3/012* (2013.01);
(Continued)

(58) Field of Classification Search
CPC .... G06F 17/5004; G06F 3/012; G06F 16/122; G06F 3/04842; G06F 3/011;
(Continued)

(56) References Cited

U.S. PATENT DOCUMENTS

| | | |
|---|---|---|
| 5,511,157 A | 4/1996 | Wang |
| 6,005,548 A | 12/1999 | Latypov et al. |

(Continued)

FOREIGN PATENT DOCUMENTS

| | | |
|---|---|---|
| CA | 2347290 A1 | 11/2002 |
| WO | 2015027105 A1 | 2/2015 |
| WO | 2015127534 A1 | 9/2015 |

OTHER PUBLICATIONS

Luchetta et al, SAPWIN—A Symbolic Simulator as a Support in Electrical Engineering Education, IEEE, 2001, pp. 1-11.*

(Continued)

*Primary Examiner* — Phu K Nguyen

(57) ABSTRACT

Aspects of the present disclosure relate to three-dimensional (3D) environment authoring and generation. In an example, a 3D environment may be authored using one or more models, wherein two-dimensional (2D) representations of the models may be manipulated using an authoring application. Models may comprise anchor points, which may be used to stitch the models together when rendering the 3D environment. In another example, a model may comprise one or more content points, which may be used to position content within the 3D environment. An environment data file may be generated based on the one or more models and content associated with content points, thereby creating a file that may be distributed to other computing devices. A viewer application may be used to generate the 3D environment based on the environment data file. Accordingly, the viewer application may stitch the models and populate the 3D environment with content.

20 Claims, 10 Drawing Sheets

(51) Int. Cl.

| | | |
|---|---|---|
| *G06T 15/20* | (2011.01) | |
| *G06F 16/11* | (2019.01) | |
| *G06T 19/00* | (2011.01) | |
| *G06F 3/01* | (2006.01) | |
| *G06F 3/0481* | (2013.01) | |
| *A63F 13/63* | (2014.01) | |
| *G06F 3/0484* | (2013.01) | |

(52) U.S. Cl.
CPC ........ *G06F 3/04815* (2013.01); *G06F 16/122* (2019.01); *G06T 15/20* (2013.01); *G06T 15/205* (2013.01); *G06T 19/006* (2013.01); *G06F 3/04842* (2013.01); *G06T 2200/24* (2013.01); *G06T 2215/16* (2013.01); *G06T 2219/2016* (2013.01)

(58) Field of Classification Search
CPC ............... G06F 3/04815; G06T 19/006; G06T 2219/2016; G06T 15/205; G06T 2215/16; G06T 19/20; G06T 2200/24; G06T 15/20; A63F 13/63
USPC ........................................................ 345/419
See application file for complete search history.

(56) References Cited

U.S. PATENT DOCUMENTS

| | | | |
|---|---|---|---|
| 6,050,822 A | 4/2000 | Faughn | |
| 7,043,695 B2 | 5/2006 | Elber et al. | |
| 7,117,450 B1 | 10/2006 | Chaudhri | |
| 7,269,632 B2 | 9/2007 | Edeker et al. | |
| 7,657,406 B2* | 2/2010 | Tolone ................ | G06F 17/5004 703/2 |
| 8,224,024 B2 | 7/2012 | Foxlin et al. | |
| 8,473,263 B2* | 6/2013 | Tolone ................... | G06Q 10/10 703/2 |
| 8,584,025 B2 | 11/2013 | Dawson et al. | |
| 8,585,476 B2 | 11/2013 | Mullen | |
| 8,601,386 B2 | 12/2013 | Altberg et al. | |
| 8,681,179 B2 | 3/2014 | Rolleston et al. | |
| 9,092,853 B2 | 7/2015 | Sachs et al. | |
| 9,111,347 B2 | 8/2015 | Himane | |
| 9,210,413 B2 | 12/2015 | Grinberg et al. | |
| 9,251,590 B2 | 2/2016 | Sharp et al. | |
| 9,311,744 B2 | 4/2016 | Wu et al. | |
| 9,392,212 B1 | 7/2016 | Ross | |
| 9,401,050 B2 | 7/2016 | Cajigas et al. | |
| 9,405,359 B2 | 8/2016 | Rhee et al. | |
| 9,520,002 B1 | 12/2016 | Gavriliuc et al. | |
| 9,817,375 B2* | 11/2017 | Li ............................ | F24F 11/30 |
| 2002/0089506 A1 | 7/2002 | Templeman | |
| 2003/0146973 A1 | 8/2003 | Swift et al. | |
| 2004/0135820 A1 | 7/2004 | Deaton et al. | |
| 2004/0233222 A1 | 11/2004 | Lee et al. | |
| 2010/0045701 A1 | 2/2010 | Scott et al. | |
| 2011/0009241 A1 | 1/2011 | Lane et al. | |
| 2011/0270135 A1 | 11/2011 | Dooley et al. | |
| 2012/0233555 A1 | 9/2012 | Psistakis et al. | |
| 2013/0024764 A1 | 1/2013 | Lou et al. | |
| 2013/0044128 A1 | 2/2013 | Liu et al. | |
| 2013/0144566 A1 | 6/2013 | De Biswas | |
| 2014/0049559 A1 | 2/2014 | Fleck et al. | |
| 2014/0245160 A1 | 8/2014 | Bauer et al. | |
| 2015/0015458 A1 | 1/2015 | Cho et al. | |
| 2015/0249815 A1 | 9/2015 | Sandrew et al. | |
| 2016/0026253 A1 | 1/2016 | Bradski et al. | |
| 2016/0027213 A1 | 1/2016 | Burns et al. | |
| 2016/0035139 A1 | 2/2016 | Fuchs et al. | |
| 2016/0078683 A1 | 3/2016 | Sudol et al. | |
| 2016/0125655 A1 | 5/2016 | Tian et al. | |
| 2016/0140763 A1 | 5/2016 | Seichter et al. | |
| 2016/0246384 A1 | 8/2016 | Mullins et al. | |
| 2017/0038837 A1 | 2/2017 | Faaborg et al. | |
| 2017/0169616 A1 | 6/2017 | Wiley et al. | |
| 2017/0180721 A1 | 6/2017 | Parker et al. | |
| 2017/0372499 A1 | 12/2017 | Lalonde | |
| 2018/0308290 A1 | 10/2018 | Perez et al. | |

OTHER PUBLICATIONS

Autodesk, 6: Joints and Motion, Autodesk Fusion 360, https://www.youtube.com/watch?v=nngmNos6VI4, Jun. 2015.*

Donzellini, G. and Ponta, D., 2007. A simulation environment for e-learning in digital design. IEEE Transactions on Industrial Electronics, 54(6), pp. 3078-3085.*

Akella et al., The Basics of Dynamic Simulation, AutoDesk University, 2006, pp. 1-24.*

Teper, Jeff, "The Future of SharePoint", https://blogs.office.com/2016/05/04/the-future-of-sharepoint/, Published on: May 4, 2016, 18 pages.

"The virtual and augmented reality market will reach $162 billion by 2020", http://www.businessinsider.com/virtual-and-augmented-reality-markets-will-reach-162-billion-by-2020-2016-8?IR=T, Published on: Aug. 22, 2016, 5 pages.

"Microsoft HoloLens", https://www.microsoft.com/microsoft-hololens/en-us, Retrieved on: Apr. 10, 2017, 8 pages.

"Oculus Connect 3—2016—Developer Sessions", https://www.youtube.com/playlist?list=PLL2xVXGs1SP7RjXUBwur43flR7tRcbYLD, Retrieved on: Apr. 10, 2017, 4 pages.

"How to Make Your Own Virtual Reality", https://cospaces.io/create.html, Retrieved on: Apr. 7, 2017, 11 pages.

Cho, et al., "3D Panorama Generation Using Depth-MapStitching", In Journal of information and communication convergence engineering, vol. 9, Issue 6, Dec. 2011, pp. 780-784.

Teitelbaum, Ron, "Are there any good Virtual Reality authoring tools out there for Subject Matter Experts (not coders) to create educational or training content?", Published on: Jun. 16, 2016, 3 pages.

Anchors, "https://docs.unity3d.com/Manual/windowsholographic-anchors.html", Published on: Mar. 29, 2017, 1 page.

"World anchor in Unity", https://developer.microsoft.com/en-us/windows/mixed-reality/world_anchor_in_unity, Retrieved on: Apr. 10, 2017, 3 pages.

"About Pre-scaling 3D Objects", Retrieved From https://docs.toonboom.com/help/storyboard-pro-5/storyboard/3d/about-pre-scale-3d-object.html, May 5, 2016, 3 Pages.

"Best Practices for Mixed Reality AR/VR Experiences", Retrieved From https://library.vuforia.com/articles/Best_Practices/Best-practices-for-hybrid-VRAR-experiences, Jan. 2011, 4 Pages.

"Camera Rotation Newbie Question", Retrieved From https://answers.unity.com/questions/1329035/camera-rotation-newbie-question.html, Apr. 10, 2017, 2 Pages.

"Chilipeppr/widget-3dviewer", Retrieved From https://github.com/chilipeppr/widget-3dviewer, Retrieved on Apr. 7, 2017, 8 Pages.

"Drone Designer", Retrieved From http://web.archive.org/web/20150610033757/http:/www.wasp3d.com/drone_designer.html, Jun. 10, 2015, 6 Pages.

"Game Object", Retrieved From https://docs.unity3d.com/Manual/class-GameObject.html, Jan. 2018, 2 Pages.

"Level of Detail", Retrieved From https://en.wikipedia.org/w/index.php?title=Level_of_detail&oldid=753162783, Dec. 5, 2016, 4 Pages.

"Space and Perspective in VR", Retrieved From https://web.archive.org/web/20180429102059/http://blog.leapmotion.com/space-and-perspective/, Mar. 14, 2017, 8 Pages.

"The Entire Internet is now 3D—ExitReality Launches Public Beta", Retrieved From http://www.exitreality.com/?page_id=156, Jul. 26, 2013, 2 Pages.

"Transform", Retrieved From https://docs.unity3d.com/Manual/class-Transform.html, Jun. 28, 2017, 2 Pages.

"Final Office Action Issued in U.S. Appl. No. 15/636,321", dated Feb. 14, 2019, 30 Pages.

"Non-Final Office Action Issued in U.S. Appl. No. 15/636,321", dated Aug. 10, 2018, 27 Pages.

"Non Final Office Action issued in U.S. Appl. No. 15/636,359", dated Oct. 4, 2018, 22 Pages.

(56) References Cited

OTHER PUBLICATIONS

Andy, Borell, "Introducing the Oculus Sample Framework for Unity 5", In Journal of Oculus Developers Blog, Mar. 8, 2016, 6 Pages.
Antoine, Jonathan, "Calculate the Real Difference Between Two Angles, Keeping the Correct Sign," Retrieved from http://blog.lexique-du-net.com/index.php?post/Calculate-the-real-difference-between-two-angles-keeping-the-sign, Apr. 1, 2009, 4 Pages.
Ashley, Speagle, "3D, Mixed Reality and the Microsoft Windows 10 Event", Retrieved From http://blogs.air-watch.com/2016/10/3d-mixed-reality-microsoft-windows-10-event/, Oct. 26, 2016, 9 Pages.
Bozgeyikli, et al., "Point & Teleport Locomotion Technique for Virtual Reality", In Proceedings of the ACM Annual Symposium on Computer-Human Interaction in Play, Sep. 16, 2016, 12 Pages.
Christopher, Greenhalgh, "Large Scale Collaborative Virtual Environments", In Publication of Springer Science & Business Media, Dec. 6, 2012, 210 Pages.
Conner, et al., "Three-Dimensional Widgets", In Proceedings of the Symposium on Interactive 3D graphics, Jun. 1, 1992, pp. 183-231.
Luebke, et al., "Level of Detail for 3D Graphics", Morgan Kaufmann Publishers, Jan. 2003, 31 Pages.
Elfarargy, et al., "VEGI: Virtual Environment GUI Immersion System", In IEEE Virtual Reality Conference, Mar. 19, 2011, pp. 205-206.
Hammond, Keith, "MakeVR Lets You Create 3D Models in Virtual Reality with Real CAD", Retrieved From https://web.archive.org/web/20171124021434/https://makezine.com/2017/03/27/makevr-lets-create-3d-models-virtual-reality-real-cad/, Mar. 27, 2017, 19 Pages.
Interrante, et al., "Seven League Boots: A New Metaphor for Augmented Locomotion through Moderately Large Scale Immersive Virtual Environments", In IEEE Symposium on 3D User Interfaces, Mar. 2007, 4 Pages.
Jonathan, Nafarrete, "Tilt Brush Adds Rotate, Resize, Import of 3D Models and Pictionary", Retrieved From https://web.archive.org/web/20160910115536/http://vrscout.com/news/tilt-brush-adds-rotate-resize-import-3d-models-pictionary/, Sep. 8, 2016, 17 Pages.
Knodel, et al., "Navidget for Immersive Virtual Environments", In Proceedings of the ACM Symposium on Virtual Reality Software and Technology, Oct. 27, 2008, 4 Pages.
Luebke, et al., "8 Perceptual Issues", In Book- Level of Detail for 3D Graphics, Morgan Kaufmann Publishers, Jan. 2003, pp. 231-239.
Ismail, Nick, "Digital Transformation in the Workplace: VR and AR will Revolutionise the Office", Retrieved From http://www.information-age.com/digital-transformation-vr-ar-will-revolutionise-office-123465183/, Mar. 22, 2017, 7 Pages.
"International Search Report and Written Opinion Issued in PCT Application No. PCT/US18/026996", dated Jul. 3, 2018, 12 Pages.
"International Search Report and Written Opinion Issued in PCT Application No. PCT/US2018/026995", dated Jul. 3, 2018, 14 Pages.
Reitmayr, et al., "Going out: Robust Model-based Tracking for Outdoor Augmented Reality", In Proceedings of the 5th IEEE and ACM International Symposium on Mixed and Augmented Reality, Oct. 22, 2006, 10 Pages.
Siddhant, Mehta, "Volumetric Framework for Third-Party Content Placement in Virtual 3D Environments", In Technical Disclosure Commons, Mar. 9, 2017, 11 Pages.
Kasriel, Stephane, "This Is What Your Future Virtual-Reality Office Will Be Like", Retrieved From https://www.fastcompany.com/3061923/this-is-what-your-future-virtual-reality-office-will-be-like, Jul. 19, 2016, 34 Pages.
Lau, Vivian, "Edan Kwan's CSS Program Can Transform Websites into 3-D", Retrieved From https://web.archive.org/web/20120725065742/https://www.trendhunter.com/trends/transform-websites-into-3-d, May 15, 2012, 3 Pages.
"International Search Report and Written Opinion Issued in PCT Application No. PCT/US18/026994", dated Jul. 3, 2018, 13 Pages.
"Camera rotation around a central pivot point", Retrieved From: http://www.java-gaming.org/topics/camera-rotation-around-a-central-pivot-point/30112/view.html, Jul. 10, 2013, 3 Pages.
"Final Office Action Issued in U.S. Appl. No. 15/636,359", dated: Apr. 8, 2019, 30 Pages.

* cited by examiner

THREE-DIMENSIONAL ENVIRONMENT AUTHORING AND GENERATION

CROSS-REFERENCE TO RELATED APPLICATIONS

This application claims the benefit of U.S. Provisional Application No. 62/489,904, filed Apr. 25, 2017, the entirety of which is incorporated by reference herein.

BACKGROUND

Publishing sites have been a key way to share and consume information on the web. A handful of services exist that democratize web site creation. However, services do not exist to solve the problem of creating sites that realize the full potential of three-dimensional (3D) content. With an increasing push to easily create and share 3D content, there is a need for tools and/or services that facilitate the authoring and/or consumption of 3D content.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to three-dimensional (3D) environment authoring and generation. In an example, a 3D environment may be authored using one or more models, wherein two-dimensional (2D) representations of the models may be selected and positioned using an authoring application. A model may comprise one or more anchor points, which may be used to stitch the model together with one or more other models when rendering the 3D environment. In another example, a model may comprise one or more content points, which may be used to position content items within the 3D environment. An environment data file may be generated based on the one or more models and content associated with content points, thereby created a file that may be distributed to other computing devices.

A viewer application may be used to generate the 3D environment based on the environment data file. As an example, the viewer application may access models indicated by an environment data file and render the models based on a stitching operation so as to create a seemingly continuous combination of the models. The viewer application may also populate the 3D environment with content based on the content points of the models. Accordingly, it may be possible to easily author 3D environments according to aspects disclosed herein, even though a user may potentially have little to no previous 3D design experience.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
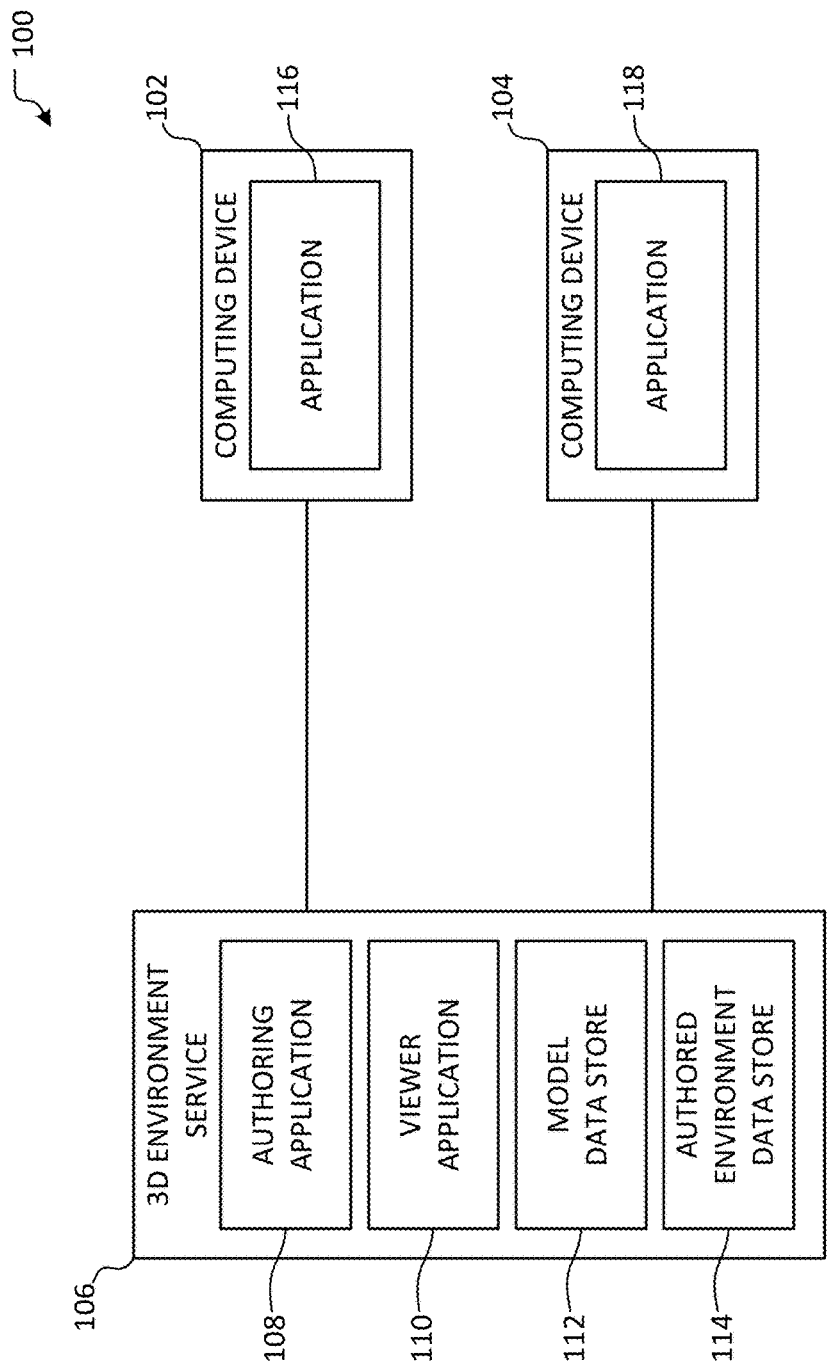
FIG. 1 illustrates an overview of an example system for three-dimensional environment authoring and generation.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure relate to three-dimensional (3D) environment authoring and generation. In an example, a 3D environment may be authored using an authoring application, wherein a user of the authoring application may graphically select two-dimensional (2D) representations of models, which may be stored as an environment data file. The environment data file may then later be used to generate a 3D environment comprising 3D renderings of the selected models. In some examples, different types of content may be embedded or included in the 3D environment. Example content includes, but is not limited to, 3D objects (e.g., 3D models, figures, shapes, etc.) or 2D objects (e.g., files, images, presentations, documents, web sites, videos, remote resources, etc.), among other content. In examples, a 3D environment may be a virtual space, such as a virtual reality (VR) world, or may be a real world space in which content may be displayed or layered on top of the real world, among other augmented reality (AR) or VR techniques.

A 3D environment authored according to aspects disclosed herein may then be consumed using a viewer application on a computing device such as a desktop computer or a smartphone. In an example, a 3D environment may be experienced across a wide spectrum of devices, ranging from low-end devices (e.g., GOOGLE CARDBOARD) to high-end devices (e.g., MICROSOFT HOLOLENS, OCULOUS RIFT, HTC VIVE, etc.). Since the same 3D environment can be generated using desktop or mobile computing devices as well, additional overhead (e.g., the transmission of all required textures, light maps, audio files, etc.) may not be required to generate the 3D environment. Further, device- or platform-specific idiosyncrasies may be handled by the viewer application, thereby making such idiosyncrasies invisible to both the end-user and the author of the 3D environment.

A 3D environment may comprise one or more models, wherein a model may comprise a virtual room, a virtual scene, or any other subpart of a virtual world. As described above, a user may use an authoring application to select, arrange, and/or customize one or more models to create a 3D environment. The 3D environment may then be stored as an environment data file, wherein the environment data file may store information relating to the one or more models and/or content to include in the 3D environment. A viewer application may be used to render a 3D environment based on the environment data file. The viewer application may comprise computing resources associated with the models used by the environment data file, such that the environment data file need not comprise such resources. In some examples, the environment data file may comprise computing resources for use when rendering the 3D environment or resources may be retrieved from a server or other remote location, among other examples.

When rendering the 3D environment, the viewer application may identify one or more anchor points within a model, which may be used when stitching adjacent or connected models specified by the environment data file together into a 3D environment. As an example, a model may comprise an entry anchor point and an exit anchor point, wherein the entry anchor point may indicate a doorway or other entrance into the model and the exit anchor point may indicate a doorway or other exit from the model. Thus, when stitching multiple models (e.g., adjacent or connected models) together, the exit anchor point of a first model may be used to position the entry anchor point of a second model (and, by extension, the second model), thereby creating a continuous combination of the models. In some examples, an anchor point may specify a direction, wherein the direction of an entry anchor point may point toward the model, while the direction of an exit anchor point may point away from the model.

In certain aspects, a content point may dictate where content can be placed (e.g., as a content item) within a 3D environment. In examples, an anchor or content point may define a rendering position within a model. In aspects, one or more anchor points may be included as part of a model (e.g., as a null point object using a basic numbering convention), which may be used by a viewer application or other renderer to obtain and append children (e.g., other models) to the anchor points. Similarly, content points may be used to position content within the model. Thus, the 3D environment having content positioned at different anchor points and/or content points may be created without requiring information about the 3D environment prior to rendering. In some examples, a user authoring a 3D environment may be able to place anchor points and/or content points within a 3D environment without needing to add code. In other examples, a user may be able to add, move, or delete content points and/or anchor points from a model.

In some examples, a set of models may be generated, wherein different room types may be predefined as part of the set. The set of models may be designed such that stitching a model together with another model from the same set may form a seemingly continuous model. In other examples, aspects of a model may be generated dynamically or programmatically. In an example, a model may indicate that certain aspects may be substituted depending on the model with which it may be stitched. As an example, a first model may indicate that a wall or archway may be replaced with a door, such that an entry point of a second model may be stitched to the first model at the door. It will be appreciated that other replacement or model generation techniques may be used without departing from the spirit of this disclosure.

FIG. 1 illustrates an overview of an example system 100 for three-dimensional environment authoring and generation. As illustrated, system 100 comprises computing devices 102 and 104, and 3D environment service 106. In an example, computing devices 102 and 104 may be any of a variety of computing devices, including, but not limited to, a mobile computing device, a laptop computing device, a tablet computing device, or a desktop computing device. In some examples, 3D environment service 106 may be provided as part of a collaborative, communication, or productivity platform. It will be appreciated that while 3D environment service 106 and elements 108-114 are illustrated as separate from computing devices 102 and/or 104, one or more of elements 108-114 may be provided by computing devices 102 and/or 104 other examples. As an example, computing device 102 may comprise authoring application 108, while computing device 104 may comprise viewer application 110.

3D environment service 106 comprises authoring application 108, viewer application 110, model data store 112, and authored environment data store 114. Authoring application 108 may be used to author a 3D environment according to aspects disclosed herein. In an example, authoring application 108 may display 2D representations of one or more 3D models, which may be selected, positioned, and/or customized by a user in order to author a 3D environment. A model may comprise one or more content points, which may be used by the user to position content within the 3D environment. In some examples, authoring application 108 may provide a variety of themes, wherein models may be associated with one or more themes, or may be altered or adapted based on a user's selected theme (e.g., colors, textures, lighting, etc. may be modified). In examples, a model may be used by multiple themes, wherein at least some of the geometric aspects of the model (e.g., the layout, architectural or geographical features, etc.) may be unchanged, while the aesthetics of the model may be varied (e.g., color scheme, lighting, audio, etc.).

Authoring application 108 may output an authored 3D environment as an environment data file, wherein the environment data file may comprise information associated with selected models (e.g., a model identifier, a model name, a model type, etc.), positioning information (e.g., coordinates, anchor point identifiers, etc.), content information (e.g., which content should be displayed for one or more content points, the content to be displayed, a reference to content, etc.), custom resources (e.g., custom textures, sounds, etc.), among other information. In some examples, authoring application 108 may be a web-based application, wherein a computing device of a user may access authoring application 108 using a web browser. In other examples, authoring application 108 may be an executable application, which may be retrieved and executed by a user's computing device.

Viewer application 110 may be used to generate, view, explore, and/or interact with a 3D environment based on an environment data file. In an example, viewer application 110 may be a web-based application, wherein a computing device of a user may access viewer application 110 using a web browser. In other examples, viewer application 110 may be an executable application, which may be retrieved and executed by a user's computing device. According to aspects disclosed herein, viewer application 110 may evaluate an environment data file to identify one or more models of a 3D environment. If an environment data file references a plurality of models, the models may be stitched together when rendering the 3D environment. Viewer application 110 may populate the rendered 3D environment with content at various content points of the one or more models, based on the content specified by the environment data file. In an example, viewer application 110 may use any of a variety of 3D rendering engines and may handle device- and/or engine-specific implementation details when rendering the 3D environment, such that the author of the environment data file need not be familiar with device- and/or engine-specific idiosyncrasies.

Model data store 112 may store one or more models that may be used to author and/or generate a 3D environment. In an example, models stored by model data store 112 may be associated with one or more themes, such that a user of authoring application 108 may select a theme and may be presented with models that are associated with the selected theme. In some examples, a set of models may be stored by model data store 112, wherein different room types may be predefined as part of the set. The set of models may be designed such stitching a model together with another model from the same set may form a seemingly continuous model. In other examples, aspects of a model stored by model data store 112 may be generated dynamically or programmatically. In an example, a model may indicate that certain aspects may be substituted depending on the model with which it may be stitched. As an example, a first model may indicate that a wall or archway may be replaced with a door, such that an entry point of a second model may be stitched to the first model at the door. It will be appreciated that other replacement or model generation techniques may be used without departing from the spirit of this disclosure.

Authored environment data store 114 may store one or more environment data files. In some examples, an "environment data file" as is used herein may be a file on a file system, an entry in a database, or may be stored using any of a variety of other data storage techniques. A 3D environment authored by authoring application 108 may be stored in authored environment data store 114. In an example where authoring application 108 is a locally-executed application, at least a part of an environment data file may be received from one of computing devices 102 and 104, and stored using authored environment data store. In some examples, viewer application 110 may retrieve an environment data file from authored environment data store 114, which, in conjunction with one or more models from model data store 112, may be used to generate a 3D environment. In an example where a viewer application is a locally-executed application, a model data store may be stored local and/or remote to the device executing the application, and at least a part of an environment data file may be retrieved from authored environment data store 114. In some examples, the data file may be streamed or retrieved in chunks, so as to reduce bandwidth consumption and/or to improve responsiveness. It will be appreciated that other data storage and/or retrieval techniques may be used without departing from the spirit of this disclosure.

Applications 116 and 118 of computing devices 102 and 104, respectively, may be any of a variety of applications. In an example, applications 116 and/or 118 may be an authoring application as described above, wherein a user of computing device 102 and/or 104 may use the application to author a 3D environment described by an environment data file. In some examples, the environment data file may be stored by authored environment data store 114. In another example, applications 116 and/or 118 may be a viewer application as described above, which may be used by a user of computing devices 102 and/or 104 to view, render, and/or explore a 3D environment defined at least in part by an environment data file. In other examples, computing devices 102 and/or 104 may comprise a model data store similar to model data store 112 and/or an authored environment data store similar to authored environment data store 114. In examples, a hardware AR and/or VR device (not pictured) may be attached to computing devices 102 and/or 104 and used to view and/or engage with a rendered 3D environment. For example, a VR or AR headset may be used.

Figure 2:
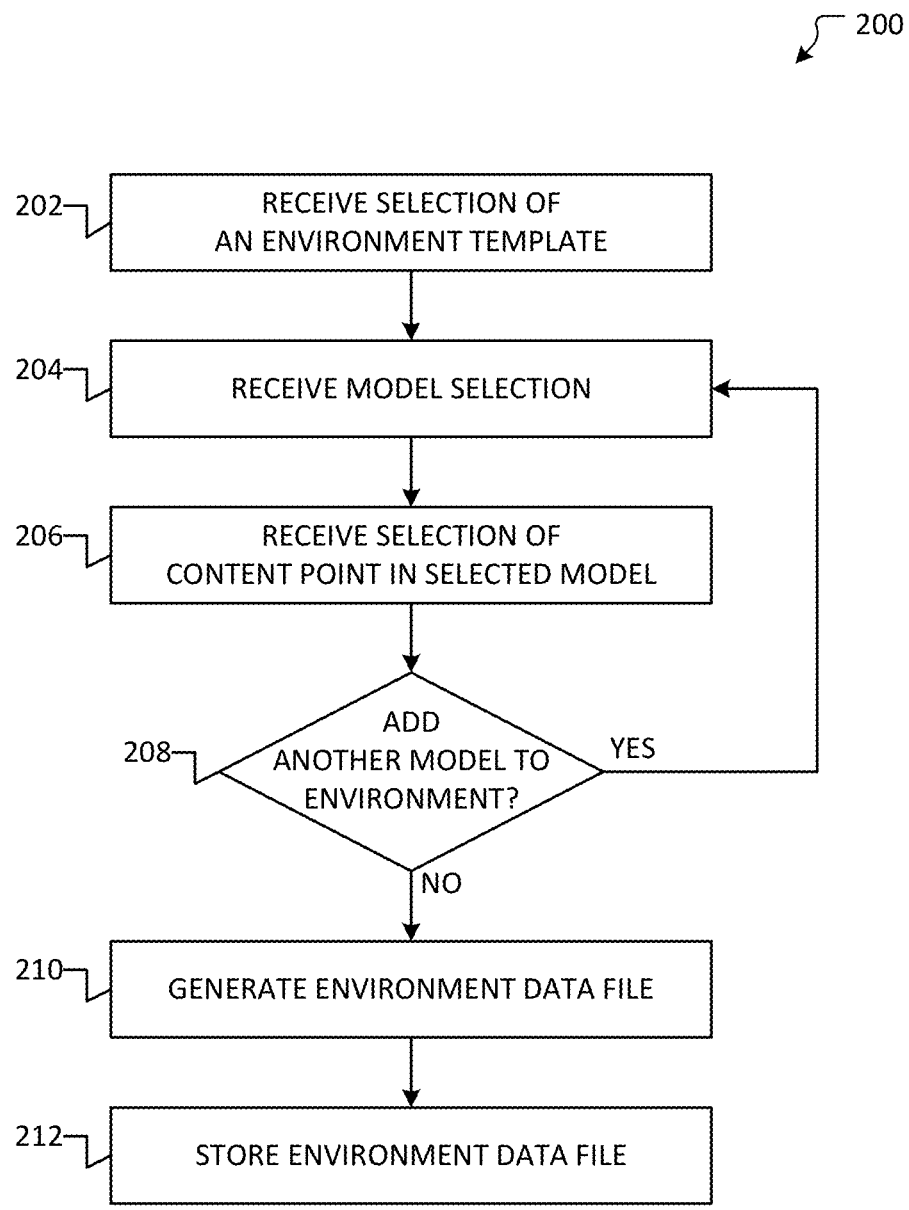
FIG. 2 illustrates an overview of an example method for authoring a three-dimensional environment using a two-dimensional representation.

FIG. 2 illustrates an overview of an example method 200 for authoring a three-dimensional environment using a two-dimensional representation. In an example, aspects of method 200 may be performed by a computing device (e.g., computing devices 102 and/or 104 in FIG. 1), or may be performed by an authoring application (e.g., authoring application 108). Flow begins at operation 202, where an environment template may be selected. The environment template may define a general look and/or feel of the 3D environment (e.g., lighting, color scheme, textures, sounds, location, etc.). For example, an office template may be selected, which can be used to generate a 3D environment representing an office, a garden template may be selected to generate a 3D environment representing an outdoor space, etc.

Upon selecting the environment template, flow continues to operation 204 where a model selection may be received. As described herein, one or more models may be presented to a user when authoring a 3D environment. In some examples, a set of models may be presented, wherein a model from the set may have been designed to be stitched together with another model from the set, thereby generating a seemingly continuous model. As an example, models in a set may have similar colors, textures, scale of objects, or theme, etc. In aspects, the 3D environment may comprise one or more different models (e.g., rooms, scenes, etc.).

Flow progresses to operation 206, where a content point may be selected within the selected model. As described above, a model may comprise one or more content points, which may be used to display or provide content at different positions within the model. Upon selection of a content point, a menu may be generated that displays different types of content that may be positioned at the selected content point. As an example, a user may select content relating to 3D objects, videos, images, documents, presentations, spreadsheets, collections of objects, and the like. The menu displayed at operation 206 may be operable to receive user input comprising a selection of one or more types of content to be positioned at the selected content point. In some examples, multiple content points may be selected, either separately or together, such that content may be associated with multiple content points of the selected model at operation 206.

In various aspects, a 3D environment may comprise multiple interconnected models. Flow continues to determination 208 where it is determined whether an additional model should be added to the 3D environment. In an example, the determination may comprise determining whether the user has provided an indication that another model should be added. In addition to receiving a selection of a new model, a placement of the model relative to one or more existing models may also be received. In one aspect, a user interface element may be positioned near an anchor point for an existing model. Upon selection of the user interface element, a menu may be displayed illustrating the types of models that can be connected to the existing model at the anchor point. The selectable models may have individual schemas and, in aspects, may have multiple different variants (e.g., no door, one door, two doors, circular, square, indoor, outdoor, etc.). The menu may be operable to receive a selection of a model from the menu. Upon receipt of the selection, a new model may be connected to the existing model at the anchor point. If an additional model is selected, flow branches "YES" and returns to operation 204. Flow may then loop between operations 204 and 208, thereby adding as many models to the 3D environment as may be desired by the user.

However, if no additional rooms are to be added, flow instead branches "NO" to operation 210. At operation 210, an environment data file describing the authored 3D environment may be generated. In an example, the environment data file may store information relating to the one or more selected models and/or content selected for content points of the models. The environment data file may be used by a viewer application to render a 3D environment according to aspects disclosed herein. In some examples, the environment data file may comprise computing resources for use when rendering the 3D environment or resources may be retrieved from a server or other remote location, among other examples.

Moving to operation 212, the environment data file may be stored. Storing the environment data file may comprise generating one or more output files or an entry in a database, among other storage techniques. In some examples, the environment data file may be provided to an authored environment data store for access by other users, such as authored environment data store 114 in FIG. 1. Flow terminates at operation 212. Accordingly, method 200 allows a user that lacks technical 3D experience to design and author a 3D environment.

Figure 3:
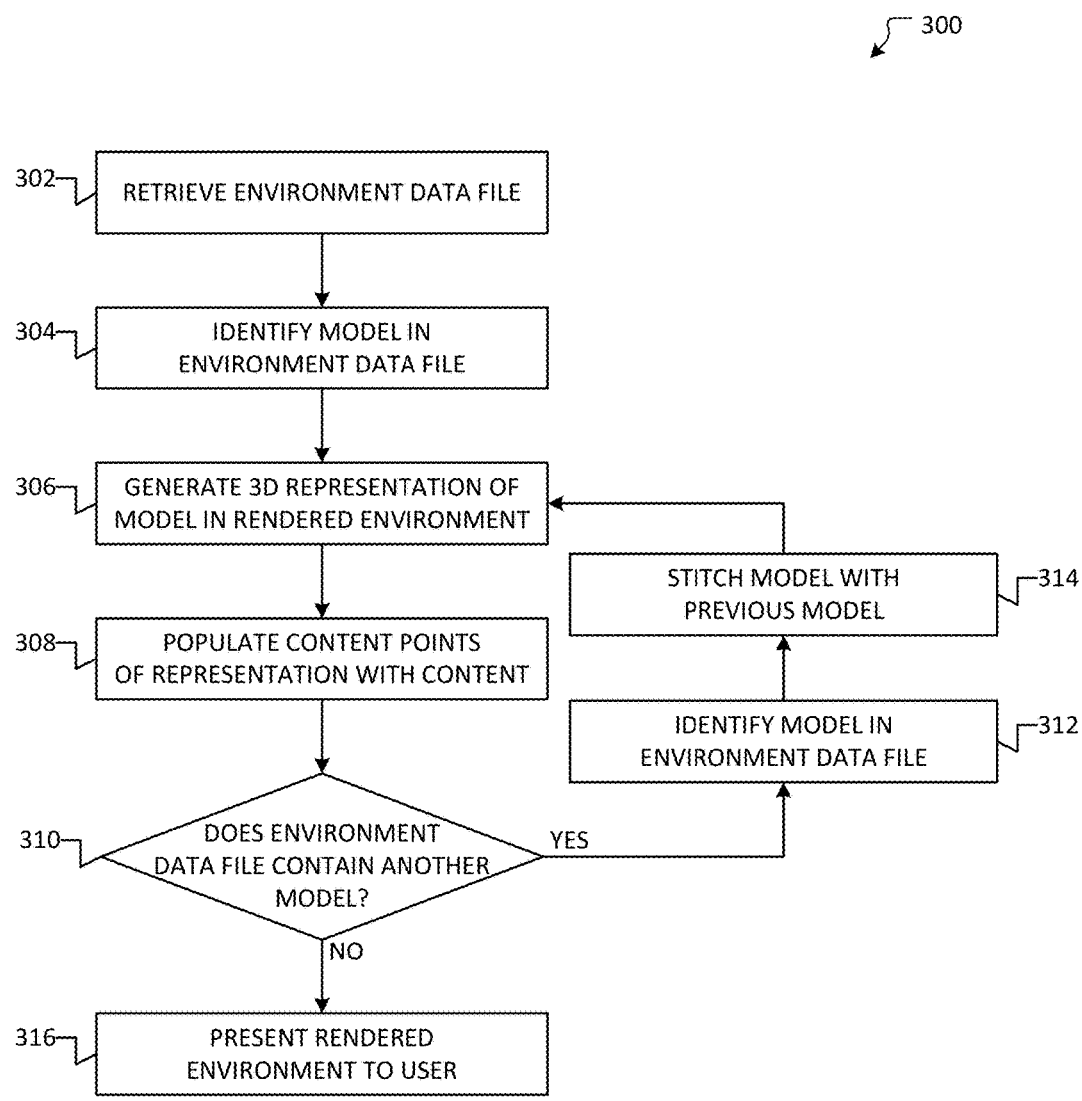
FIG. 3 illustrates an overview of an example method for generating a three-dimensional environment.

FIG. 3 illustrates an overview of an example method 300 for generating a three-dimensional environment. In an example, aspects of method 300 may be performed by a computing device (e.g., computing devices 102 and/or 104 in FIG. 1), or may be performed by a viewer application (e.g., viewer application 110). Flow begins at operation 302, where an environment data file may be retrieved. The environment data file may be retrieved from a local or remote data store. In some examples, the environment data file may be retrieved from an authored environment data store, such as authored environment data store 114 in FIG. 1. In some examples, only a part of the environment data file may be retrieved initially, while subsequent parts may be retrieved either on demand or based on available computing resources, among other examples.

Flow progresses to operation 304, where a model may be identified in the retrieved environment data file. In an example, the model may be specified by a model identifier, a model name, etc. In another example, the model may be associated with other information, including, but not limited to, a number of entrances or exits, or a theme. In some examples, the model may be selected from the environment data file based on the model's proximity to the user's position in the 3D environment or based on an expected time to acquire the required assets to render the model, among other criteria.

At operation 306, a 3D representation of the model may be rendered in the 3D environment. Rendering the model may comprise accessing resources associated with the model. In an example, the resources may be stored locally or remotely, or a combination thereof. In some examples, a third-party rendering engine may be used to render the environment. In some examples, a model may be adjusted or modified before or while it is rendered. As an example, entrances and/or exits may be dynamically updated according to aspects disclosed herein. In another example, the colors, lighting, or textures of a model may be altered. It will be appreciated that any of a variety of rendering techniques may be used without departing from the spirit of this disclosure.

Moving to operation 308, content points of the model may be populated with content as indicated by the environment data file. As an example, a 2D representation of content may be generated for a document, a webpage, or other two-dimensional content. In another example, a 3D object may be rendered as floating in the model or may be placed on a pedestal, among other content. At least a part of the content may be stored by the environment data file, may be stored locally elsewhere on the device, or may be retrieved from a remote location.

At determination 310, it may be determined whether the environment data file contains another model. In some examples, the determination may further comprise evaluating available computing resources, wherein flow may pause at determination 310 such that computing resources may be dedicated to rendering other parts of the 3D environment, among other operations. If it is determined that the environment data file does not contain another model, flow branches "NO" to operation 316, where the rendered 3D environment may be presented to the user. In some examples, at least a partial rendered environment may be presented to the user earlier in method 300. In some examples, the user may be initially placed in a welcome room or at a predefined location in the 3D environment. Flow terminates at operation 316.

If, however, it is determined at determination 310 that the environment data file comprises an additional model, flow instead branches "YES" to operation 312, where a next model may be identified from the environment data file. In an example, the model may be specified by a model identifier, a model name, etc. In another example, the model may be associated with other information, including, but not limited to, a number of entrances or exits, or a theme. In some examples, the model may be selected from the environment data file based on the model's proximity to the user's position in the 3D environment or based on an expected time to acquire the required assets to render the model, among other criteria.

Flow progresses to operation 314, where the newly-identified model may be stitched with the previous model. In an example, anchor points of both models may be identified and used to determine the location at which the next model should be rendered. For example, an exit anchor point of the previous model may be identified and used to determine a location for an entry anchor point of the new model. In other examples, a model may be adjusted (e.g., replacing a wall with a door, refining textures, changing scaling, etc.). It will be appreciated that other operations may be performed to stitch the two models without departing from the spirit of this disclosure. Flow then moves to operation 306, where the new model may be rendered in the 3D environment, according to the stitching determinations from operation 314. Flow then continues through operations 308 and 310 based on the newly identified model. Eventually, no additional models will be present for rendering and flow will terminate at operation 316 as discussed above.

Figure 4:
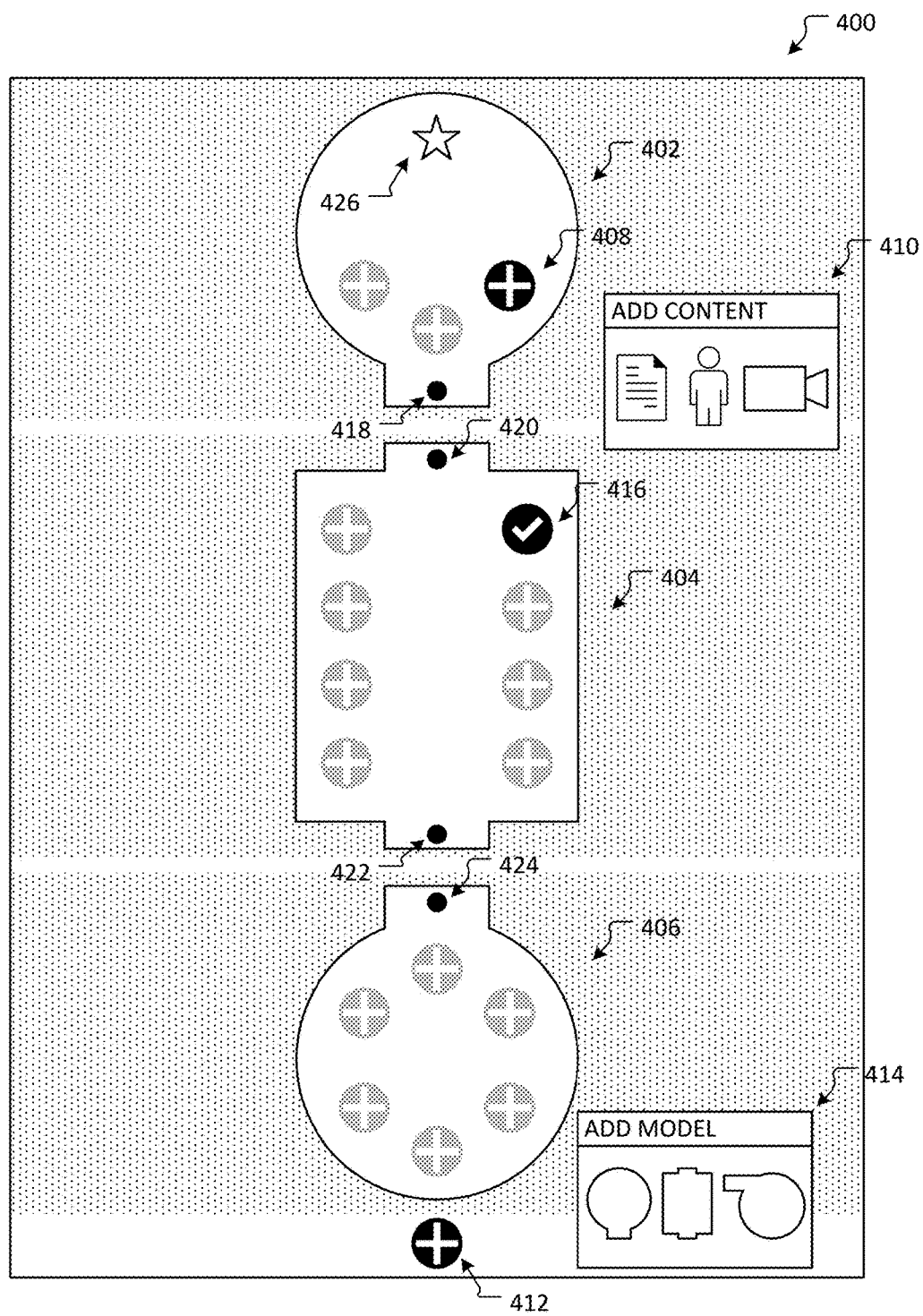
FIG. 4 illustrates an overview of an example user interface for authoring a three-dimensional environment using two-dimensional models.

FIG. 4 illustrates an overview of an example user interface 400 for authoring a three-dimensional environment using two-dimensional models. The example 3D environment shown in user interface 400 comprises three different models, which, in the instant example, are rooms: room 402, 404, and 406. In an example, star 426 may indicate an initial position for the perspective of a user when the 3D environment is first rendered. In some examples, the initial position may be moveable using user interface 400, while, in other examples, a "welcome" room type may specify a user's initial position in the 3D environment.

As illustrated, rooms 402, 404, and 406 comprise one or more content points, such as content point 416. Content point 416 is illustrated as a checkmark, thereby indicating that content is associated with content point 416. By contrast, content point 408 is illustrated as a dark plus (as compared to the grey, unassociated content points) to indicate that content point 408 is currently selected. In response to the selection, menu 410 displaying different types of available content may be displayed. It will be appreciated that while menu 410 is illustrated as providing three content options, any of a variety of content may be selected as discussed in further detail above. Upon receiving a selection of one of the available content types via menu 410, the selected content may be positioned at content point 408.

Anchor points 418, 420, 422, and 424 may indicate the anchor points for rooms 402, 404, and 406. While the anchor points may not be visible when the 3D environment is ultimately rendered, user interface 400 may display entry anchor points 418 and 424 alongside exit anchor points 418 and 422 in order to illustrate the flow of the 3D environment and to provide an indication as to how rooms 402, 404, and 406 fit together.

User interface 400 may also include one or more user interface elements that provide for the addition of a new model at a connection point of an existing model. For example, user interface element 412 may be operable to receive a selection to add a new room. Upon receiving a selection at user interface element 412, a room menu 414 may be displayed. The room menu 414 may display one or more different types of rooms that can be connected at the connection point. Upon receiving a selection of a room at room menu 414, a new room may be added to the displayed 2D representation of the 3D environment. While example rooms and models are discussed herein, it will be appreciated that any of a variety of model and/or room types may be used without departing from the spirit of this disclosure.

Figure 5:
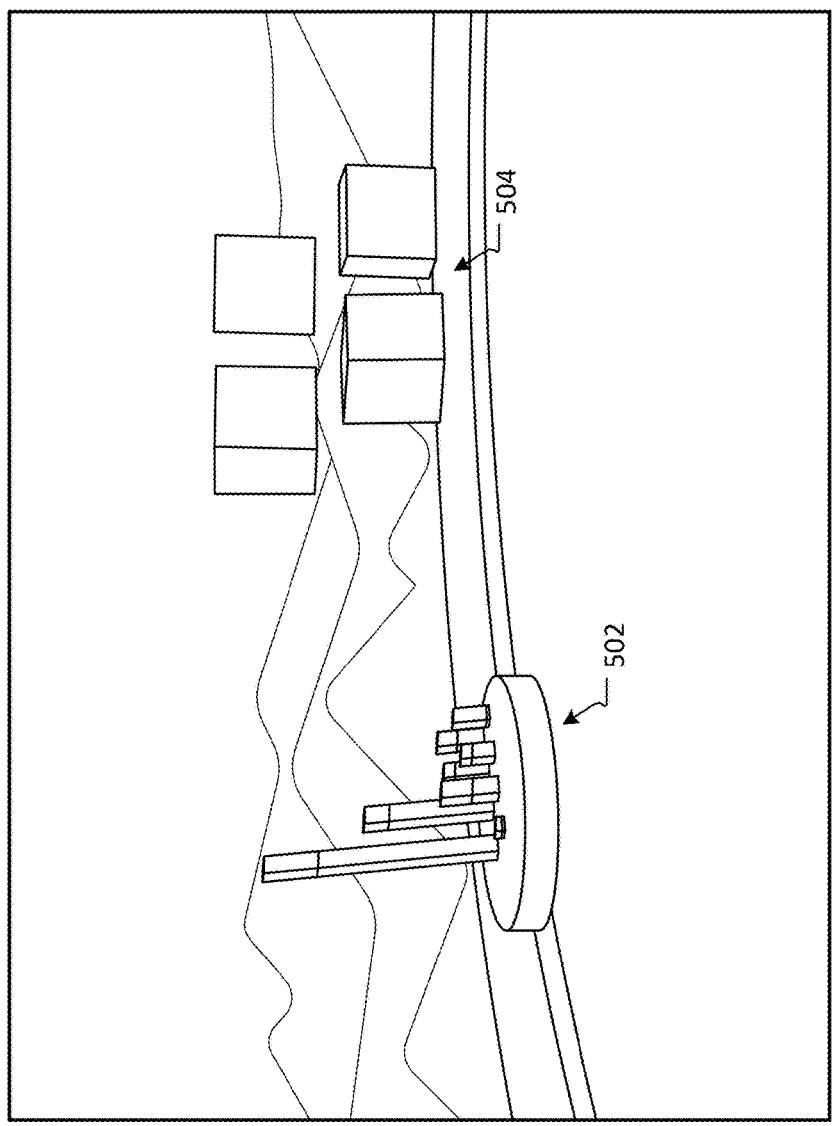
FIG. 5 illustrates an example view within a three-dimensional environment.

FIG. 5 illustrates an example view 500 within a three-dimensional environment. In an examples, view 500 may be a view generated based on an environment data file according to aspects disclosed herein. View 500 may be a user's perspective within a model (e.g., room 402 in FIG. 4) of a 3D environment, such that an author of the 3D environment may have specified that content 502 and 504 should be presented to the user at the content points of the model.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
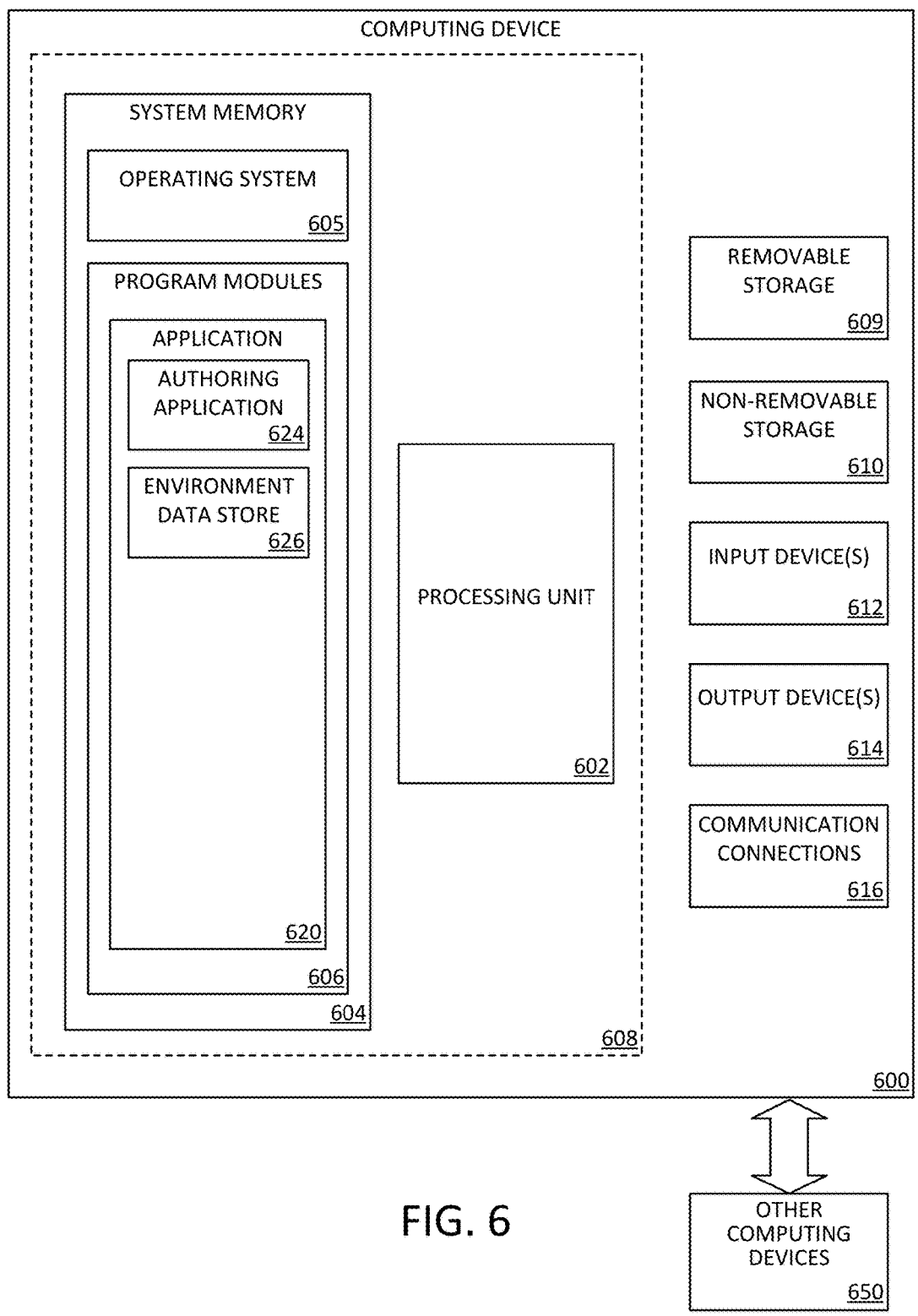
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including the computing devices 102 and 104 and the 3D environment service 106. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store authoring application 624 and environment data store 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
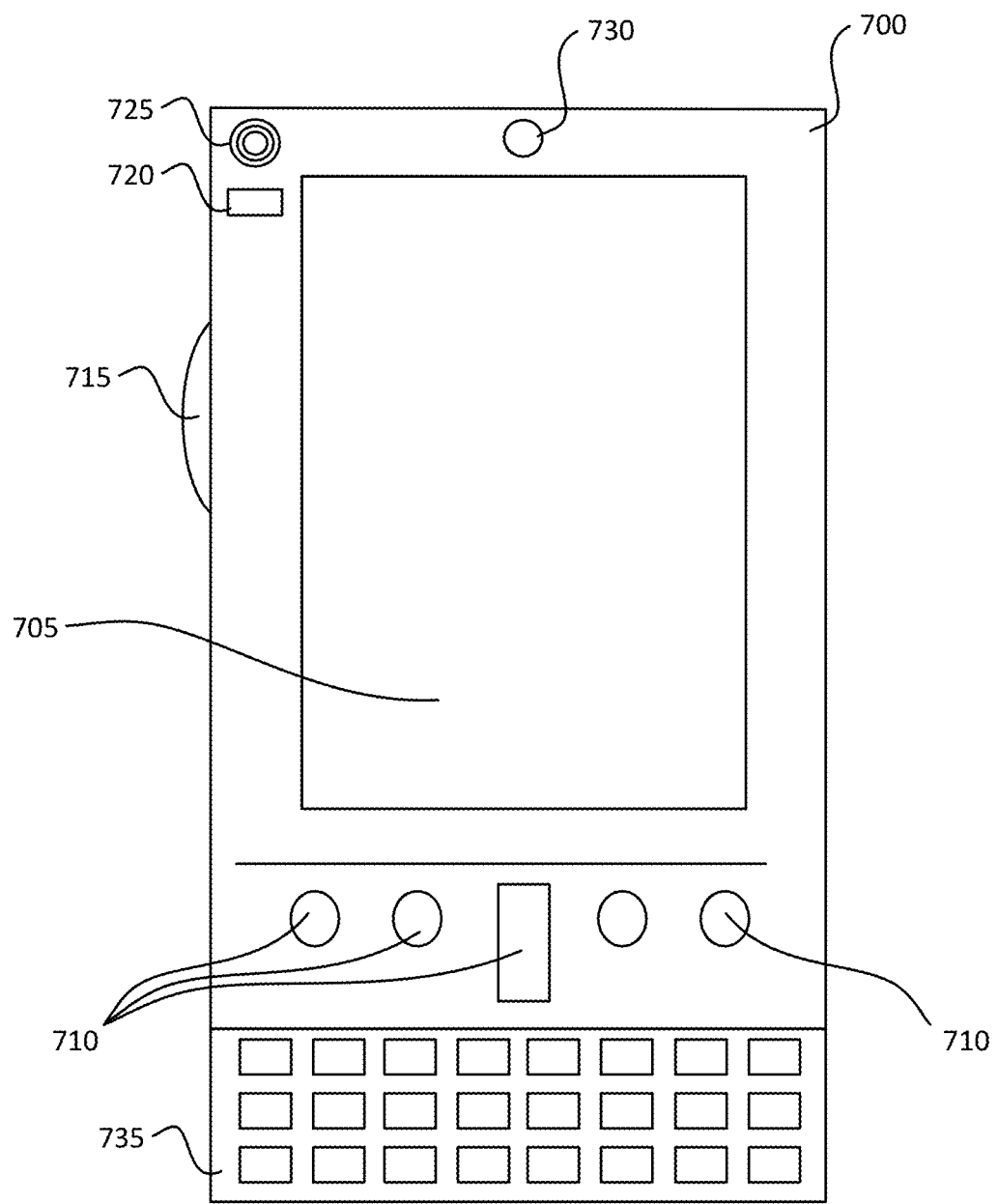
FIGS. 7A and 7B are simplified block diagrams of a mobile computing device with which aspects of the present disclosure may be practiced.
Figure 7B:
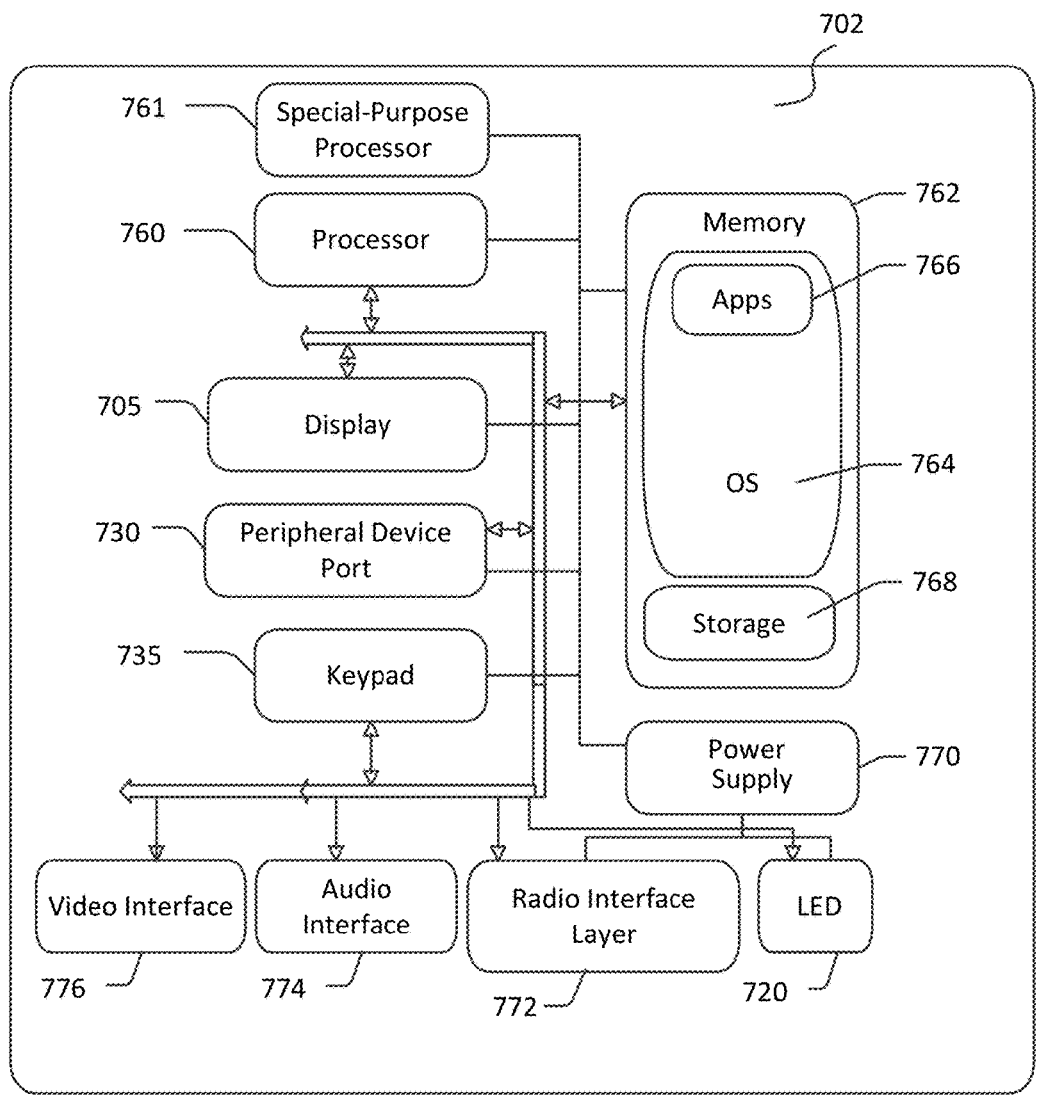

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
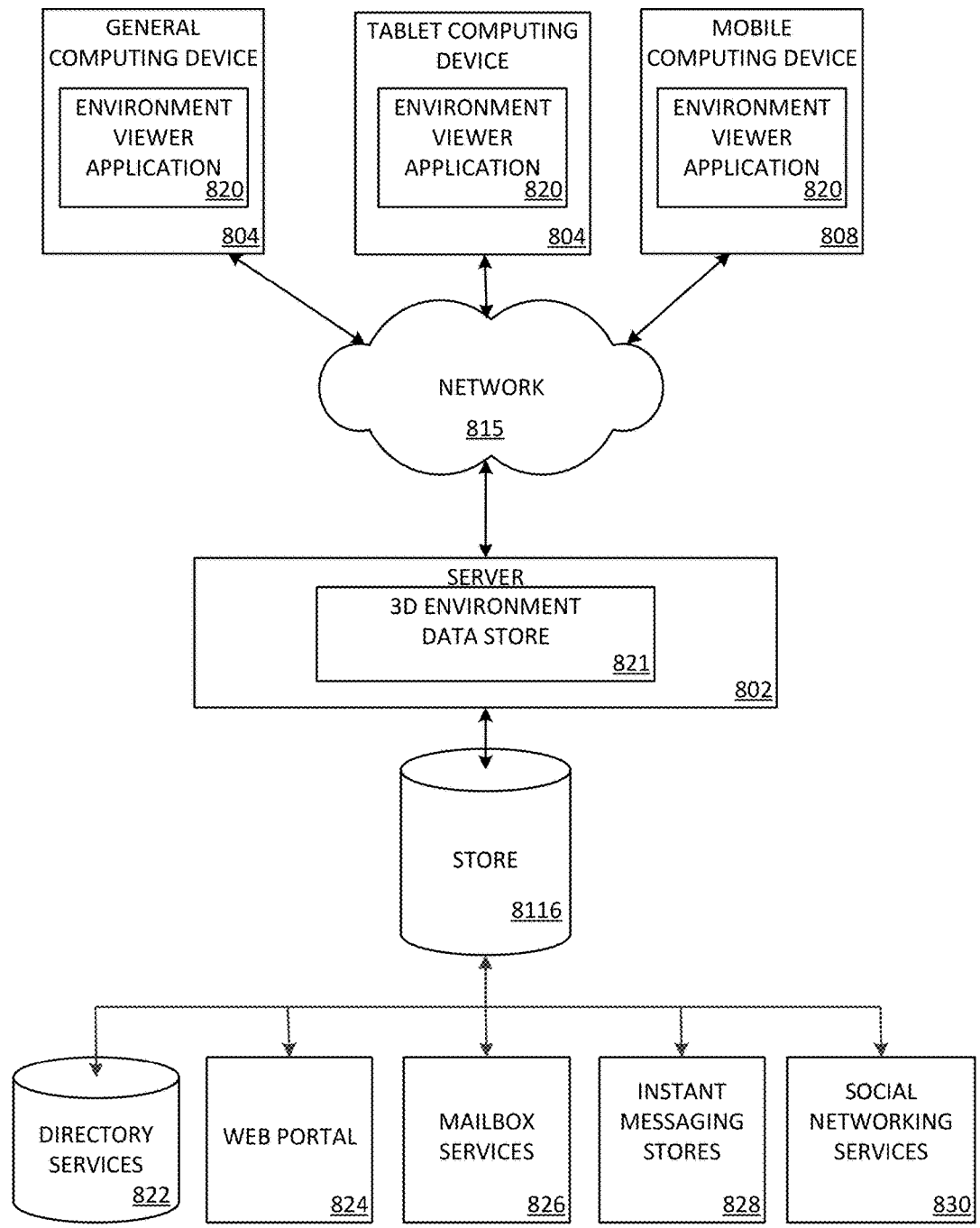
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

An environment view application 820 may be employed by a client that communicates with server device 802, and/or the 3D environment data store 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
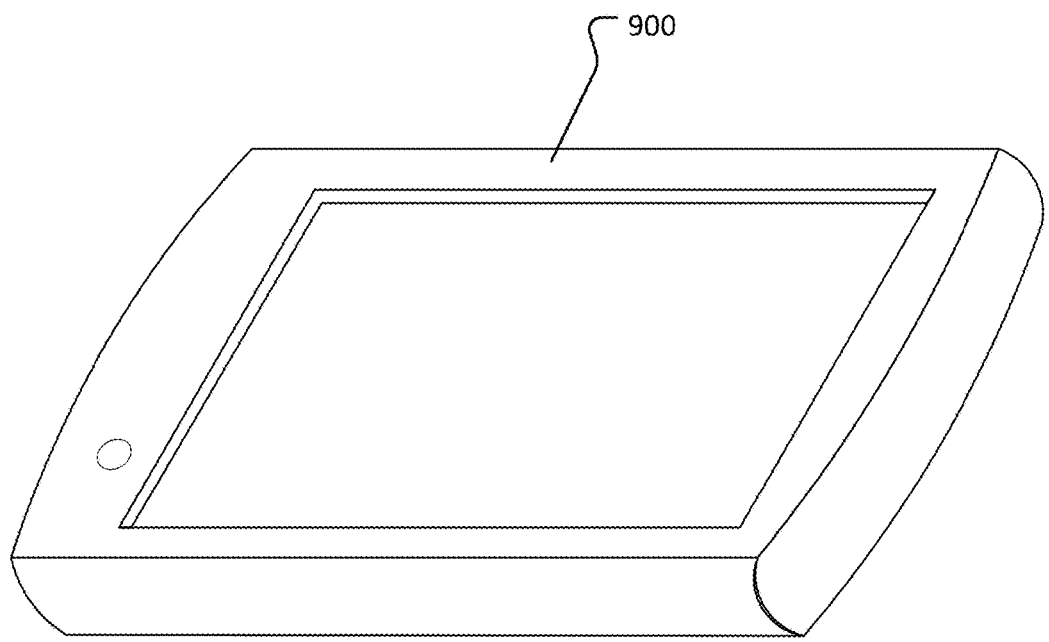
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: retrieving an environment data file, wherein the environment data file comprises a plurality of models for a three-dimensional (3D) environment; generating, in the 3D environment, a first 3D representation of a first model of the plurality of models, wherein the first model is associated with an exit anchor point; determining that the environment data file indicates that a second model of the plurality of models is adjacent to the first model, wherein the second model is associated with an entry anchor point; and based on determining that the second model is adjacent to the first model, generating a second 3D representation of the second model, wherein the representation of the second model is positioned in the 3D environment such that the entry anchor point associated with the second model is positioned proximately to the entry point of the first model. In an example, generating the first 3D representation of the first model comprises: determining that the environment data file specifies a content item associated with a content point of the first model; and generating a representation of the content item at the content point of the first model in the first 3D representation. In another example, generating the representation of the content item comprises generating a request for a remote resource associated with the content item. In a further example, the set of operations further comprises: presenting the 3D representation on a display of a user device. In yet another example, the first model indicates an initial position for a perspective of a user, and wherein presenting the 3D representation comprises presenting the 3D representation from the initial position for the perspective of the user. In a further still example, retrieving the environment data file comprises requesting at least a part of the environment data file from a remote data store. In another example, the first model and the second model comprise a set of models having a similar theme.

In another aspect, the technology relates to a method for generating an environment data file representing a three-dimensional (3D) environment. The method comprises: receiving a user selection of an environment template for the 3D environment; receiving a user selection of a first model, wherein the first model is associated with the selected environment template; presenting a two-dimensional (2D) display of the first model, wherein the 2D display comprises a display of one or more content points of the first model; receiving a user selection of a content point from the one or more content points indicating content for display at the selected content point; and generating the environment data file, wherein the environment data file comprises information about the selected environment template, the first model, and the selected content point, wherein the selected content point is associated with the indicated content. In an example, the method further comprises: presenting a display of one or more models associated with the selected environment template, wherein the one or more models are displayed using 2D representations. In another example, the method further comprises: receiving a selection of an initial position for a perspective of a user, wherein the selection is located within the first model; and storing the received selection as part of the environment data file. In a further example, the method further comprises: receiving a selection of a second model, wherein the selection comprises an indication that the second model is positioned adjacent to the first model. In yet another example, the environment data file comprises an identifier associated with the first model and an identifier associated with the second model. In a further still example, the method further comprises: storing the generated environment data file at a remote data store for access by one or more user devices.

In a further aspect, the technology relates to a method for generating a three-dimensional (3D) environment using an environment data file. The method comprises: retrieving the environment data file, wherein the environment data file comprises a plurality of models for the 3D environment; generating, in the 3D environment, a first 3D representation of a first model of the plurality of models, wherein the first model is associated with an exit anchor point; determining that the environment data file indicates that a second model of the plurality of models is adjacent to the first model, wherein the second model is associated with an entry anchor point; and based on determining that the second model is adjacent to the first model, generating a second 3D representation of the second model, wherein the representation of the second model is positioned in the 3D environment such that the entry anchor point associated with the second model is positioned proximately to the entry point of the first model. In an example, generating the first 3D representation of the first model comprises: determining that the environment data file specifies a content item associated with a content point of the first model; and generating a representation of the content item at the content point of the first model in the first 3D representation. In another example, generating the representation of the content item comprises generating a request for a remote resource associated with the content item. In a further example, the method further comprises: presenting the 3D representation on a display of a user device. In yet another example, the first model indicates an initial position for a perspective of a user, and wherein presenting the 3D representation comprises presenting the 3D representation from the initial position for the perspective of the user. In a further still example, retrieving the environment data file comprises requesting at least a part of the environment data file from a remote data store. In another example, the first model and the second model comprise a set of models having a similar theme.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      retrieving an environment data file, wherein the environment data file comprises a plurality of models for a three-dimensional (3D) virtual reality environment in which a perspective of a user is used to view the 3D virtual reality environment;
      generating, in the 3D virtual reality environment, a first 3D representation of a first model of the plurality of models, wherein the first model is associated with an exit anchor point;
      determining that the environment data file indicates that a second model of the plurality of models is adjacent to the first model, wherein the second model is associated with an entry anchor point; and
      based on determining that the second model is adjacent to the first model, generating a second 3D representation of the second model, wherein the second 3D representation of the second model is positioned in the 3D virtual reality environment such that the entry anchor point associated with the second model is positioned proximately to the entry point of the first model, thereby causing the first 3D representation and the second 3D representation to appear as a continuous model when viewed from the perspective of the user within the 3D virtual reality environment.

2. The system of claim 1, wherein generating the first 3D representation of the first model comprises:
   determining that the environment data file specifies a content item associated with a content point of the first model; and generating a representation of the content item at the content point of the first model in the first 3D representation.

3. The system of claim 2, wherein generating the representation of the content item comprises generating a request for a remote resource associated with the content item.

4. The system of claim 1, wherein the set of operations further comprises:
presenting at least a part of the first 3D representation and at least a part of the second 3D representation on a display of a user device.

5. The system of claim 4, wherein the first model indicates an initial position for a perspective of a user, and wherein at least a part of the first 3D representation and at least a part of the second 3D representation are presented from the initial position for the perspective of the user.

6. The system of claim 1, wherein retrieving the environment data file comprises requesting at least a part of the environment data file from a remote data store.

7. The system of claim 1, wherein the first model and the second model comprise a set of models having a similar theme.

8. A computer-implemented method for generating an environment data file representing a three-dimensional (3D) virtual reality environment, comprising:
receiving a user selection of an environment template for the 3D virtual reality environment;
receiving a user selection of a first model, wherein the first model is associated with the selected environment template;
presenting a two-dimensional (2D) display of the first model, wherein the 2D display comprises a display of one or more content points of the first model;
receiving a user selection of a content point from the one or more content points indicating content for display at the selected content point; and
generating the environment data file, wherein the environment data file comprises information about the selected environment template, the first model, and the selected content point, wherein the selected content point is associated with the indicated content.

9. The computer-implemented method of claim 8, further comprising:
presenting a display of one or more models associated with the selected environment template, wherein the one or more models are displayed using 2D representations.

10. The computer-implemented method of claim 8, further comprising:
receiving a selection of an initial position for a perspective of a user, wherein the selection is located within the first model; and
storing the received selection as part of the environment data file.

11. The computer-implemented method of claim 8, further comprising:
receiving a selection of a second model, wherein the selection comprises an indication that the second model is positioned adjacent to the first model.

12. The computer-implemented method of claim 11, wherein the environment data file comprises an identifier associated with the first model and an identifier associated with the second model.

13. The computer-implemented method of claim 8, further comprising:
storing the generated environment data file at a remote data store for access by one or more user devices.

14. A computer-implemented method for generating a three-dimensional (3D) virtual reality environment using an environment data file:
retrieving the environment data file, wherein the environment data file comprises a plurality of models for the 3D virtual reality environment in which a perspective of a user is used to view the 3D virtual reality environment;
generating, in the 3D virtual reality environment, a first 3D representation of a first model of the plurality of models, wherein the first model is associated with an exit anchor point;
determining that the environment data file indicates that a second model of the plurality of models is adjacent to the first model, wherein the second model is associated with an entry anchor point; and
based on determining that the second model is adjacent to the first model, generating a second 3D representation of the second model, wherein the second 3D representation of the second model is positioned in the 3D virtual reality environment such that the entry anchor point associated with the second model is positioned proximately to the entry point of the first model, thereby causing the first 3D representation and the second 3D representation to appear as a continuous model when viewed from the perspective of the user within the 3D virtual reality environment.

15. The method of claim 14, wherein generating the first 3D representation of the first model comprises:
determining that the environment data file specifies a content item associated with a content point of the first model; and
generating a representation of the content item at the content point of the first model in the first 3D representation.

16. The method of claim 15, wherein generating the representation of the content item comprises generating a request for a remote resource associated with the content item.

17. The method of claim 14, further comprising:
presenting at least a part of the first 3D representation and at least a part of the second 3D representation on a display of a user device.

18. The method of claim 17, wherein the first model indicates an initial position for a perspective of a user, and wherein at least a part of the first 3D representation and at least a part of the second 3D representation are presented from the initial position for the perspective of the user.

19. The method of claim 14, wherein retrieving the environment data file comprises requesting at least a part of the environment data file from a remote data store.

20. The method of claim 14, wherein the first model and the second model comprise a set of models having a similar theme.

* * * * *